June 27, 1939.  A. F. FISCHER  2,163,596
CLUTCHING MECHANISM
Filed Feb. 8, 1938  2 Sheets-Sheet 2
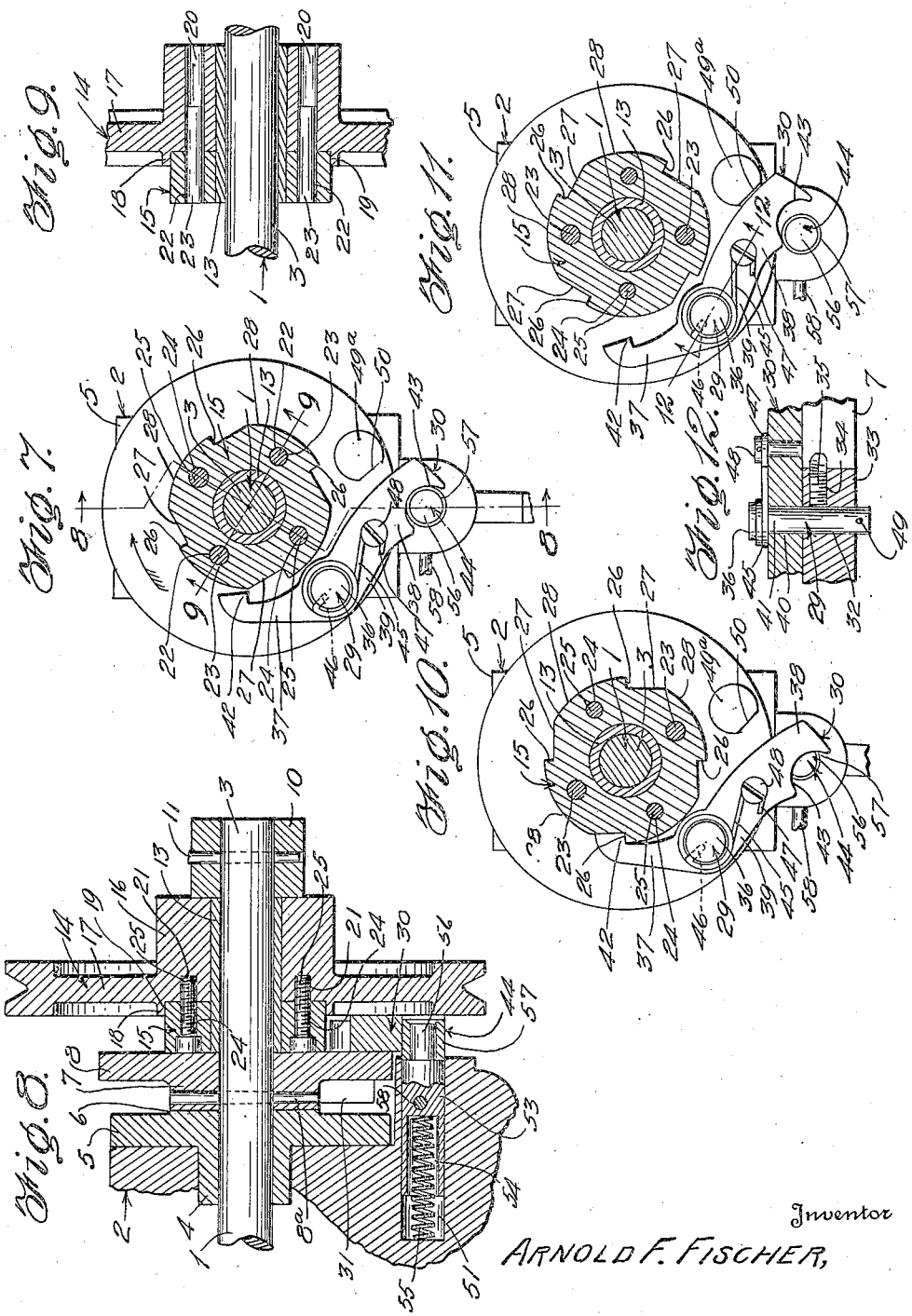
Inventor
ARNOLD F. FISCHER,
By Kimmel & Crowell
Attorneys Patented June 27, 1939

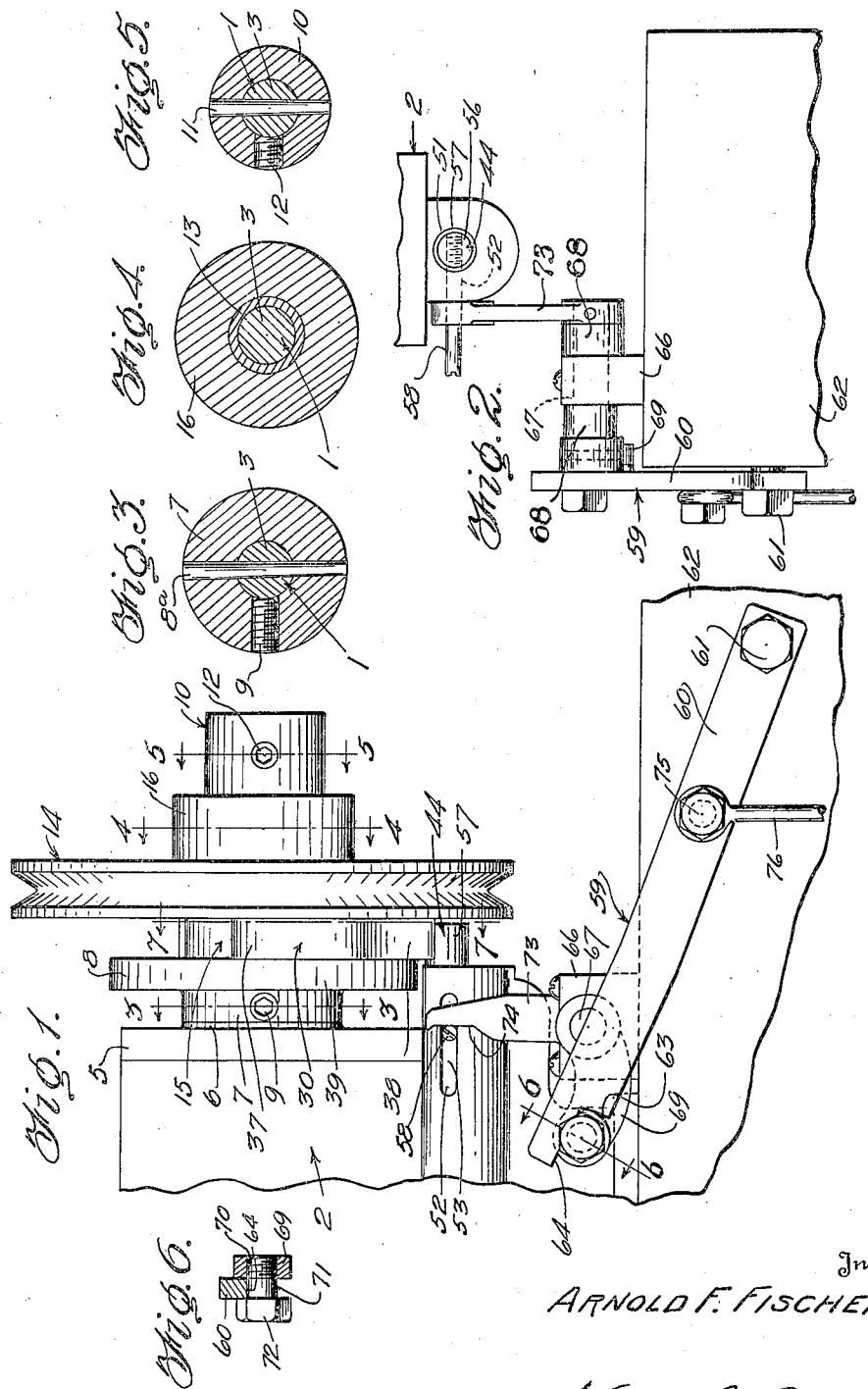

2,163,596

UNITED STATES PATENT OFFICE 2,163,596

CLUTCHING MECHANISM

Arnold Ferdinand Fischer, Astoria, Long Island, N. Y., assignor to Hobbs Sales & Service Station, Inc., New York, N. Y., a corporation of New York Application February 8, 1938, Serial No. 189,460

6 Claims. (Cl. 192—28)

This invention relates to a clutching mechanism for intermittently clutching the operating shaft of a machine to its prime mover, and is designed primarily for use in connection with the operating shaft of a stapling machine, but it is to be understood that the clutching mechanism, in accordance with this invention, is for use in any connection for which it may be found applicable.

It is well known that clutches of the class to which this invention belongs and constructed with brakes are objectionable in that if the brake becomes saturated with oil, the machine with which the brake is employed can turn over after the brake has been applied, or if not, it will create a rattling noise and the operation of the machine must be stopped to repair the brake. To overcome the aforesaid objections is one of the aims of this invention, and to this end the clutch in accordance with this invention is of the type which does not require separate or special brake mechanisms.

The invention has for its object to provide, in a manner as hereinafter set forth, a clutching mechanism for intermittently controlling the operation of the operating shaft of a machine.

The invention has for its further object to provide, in a manner as hereinafter set forth, an automatically releasable clutching mechanism for controlling the operation of the operating shaft of a machine.

The invention has for its further object to provide, in a manner as hereinafter set forth, a clutching mechanism for controlling the stapling cycle of a stapling machine.

Further objects of the invention are to provide, in a manner as hereinafter set forth, a clutching mechanism for the purpose referred to which is comparatively simple in its construction and arrangement, strong, durable, compact, readily installed with respect to a prime mover for a shaft which is driven from the latter, thoroughly efficient in its use, conveniently repaired when occasion requires, and comparatively inexpensive to set up.

The invention further aims to provide, in a manner as hereinafter set forth, a clutch of the non-repeating type.

The invention also aims to provide, in a manner as hereinafter set forth, a non-repeating brakeless clutch having no backlash whereby the clutch is expeditiously thrown into action by less power than what is required by a clutch of the type including a brake and subject to backlash.

The invention likewise aims to provide, in a manner as hereinafter set forth, a brakeless clutch having a safety stop.

The invention further aims to provide, in a manner as hereinafter set forth, a brakeless clutch having a positive non-repeat stop or backlash stop.

Embodying the foregoing objects and to others which may hereinafter appear, the invention consists of the novel construction, combination and arrangement of parts as will be more specifically described and illustrated in the accompanying drawings, wherein is shown an embodiment of the invention, but it is to be understood that changes, variations and modifications may be resorted to which fall within the scope of the invention as claimed.

In the drawings:

Figure 1 is a side elevation of a clutching mechanism in accordance with this invention showing the installation thereof, by way of example, with respect to the operating shaft of a stapling machine, Figure 2 is a fragmentary view in front elevation of the clutching mechanism, Figures 3, 4, 5 and 6 are respectively sections on lines 3—3, 4—4, 5—5, and 6—6 Figure 1, Figure 7 is a section on line 7—7 Figure 1 illustrating the clutching mechanism in non-driving position, Figure 8 is a section on line 8—8 Figure 7, Figure 9 is a section on line 9—9 Figure 7, Figure 10 is a section on line 7—7 Figure 1 with the clutching mechanism in driving position, Figure 11 is a section on line 7—7 Figure 1 illustrating the parts of the clutching mechanism as they appear immediately after the clutching mechanism has been shifted from driving position, and Figure 12 is a section on line 12—12 Figure 11.

With reference to the drawings, 1 indicates the operating shaft of a machine and by way of example, such shaft is the operating shaft of a stapling machine 2. The shaft 1 includes a portion 3 which is extended laterally from the upper portion of the machine 2. The latter is provided with a bearing sleeve 4 formed with an annular flange 5 having an annular boss 6 on its outer face. The bearing 4 extends into the machine 2. The flange 5 abuts the body of the machine (Figure 8). The boss 6 is of materially less diameter than the flange 5. The shaft 1 extends through and outwardly from bearing 4.

Abutting against the boss 6 is a sleeve 7 formed at its outer end with an annular flange 8. The portion 3 of shaft 1 extends through the sleeve 7 and projects outwardly from the latter. The sleeve 7 corresponds in diameter to the diameter of the boss 6 and is secured to the portion 3 of shaft 1 by a pin 8ᵃ anchored in and disposed diametrically of shaft 1 and sleeve 7. The latter is also secured to shaft 1 by a set screw 9. The outer end terminal part of the portion 3 of shaft 1 has mounted thereon a collar 10 which is fixedly secured to shaft 1 by a pin 11 extending through and disposed diametrically of shaft 1 and collar 10. The latter is also secured to shaft 1 by a set screw 12. Mounted on shaft portion 3 between the sleeve 7 and the collar 10 is a tubular bushing 13 abutting at its ends said sleeve 7 and collar 10.

Revolubly mounted on the bushing 13 is a groove pulley 14 and the annular ratchet element 15 of the clutching mechanism. The pulley 14 is operated by any suitable belt transmission and is termed the prime mover for the shaft 1. The pulley 14 is formed with a hub 16 extended outwardly over one side of the web 17 of the pulley. The hub 16 extends to the collar 10. The inner side of the web 17 is formed with an annular collar 18. The hub 16 is mounted directly on bushing 13. The collar 18 is spaced from the bushing 13 and provides the pulley 14 with a circular recess 19. The ratchet element 15 is of greater length than the depth of recess 19. The element 15 has an end portion seated in recess 19 and said element is of a length to extend from the base of recess 19 to the sleeve 7. The latter and collar 10 confines the pulley 14 and element 15 on the bushing 13. The pulley 14 and element 15 revolve in unison and revolve about the bushing 13.

The pulley 14 is formed with a pair of spaced parallel openings 20 which extend from the base of the recess 19 to the outer end of the hub 16. The body of the pulley 14 is formed with a pair of parallel spaced threaded sockets 21 which open at the base of recess 19. The element 15 is provided with a pair of spaced parallel openings 22 extending from the inner to the outer face of such element and registering with the openings 20. Extending through the openings 22 and engaging in the openings 20 are securing pins 23 for connecting pulley 14 and element 15 together. The latter is formed with a pair of spaced parallel countersunk openings 24 extending from the rear to the front of said element 15 and registering with the sockets 21. Countersunk in the element 15 and extending through the openings 24 as well as engaging with the walls of the sockets 21 are holdfast means 25 which also act to secure the pulley 14 and element 15 together. The pins 22 and holdfast means 25 maintain the element 15 in abutting relation with respect to the pulley 14.

The ratchet element 15 has its edge formed with spaced ratchets 26 which are slightly inclined in the direction of revolution of the element 15. The element 15 is formed with edge facets 27 inclining inwardly from their upper to their lower ends and merging at their lower ends into the inner ends of the ratchets 26. The element 15 is formed with the curved edge of facets 28 which extend from the outer ends of facets 27 to the outer ends of the ratchets 26. The diameter of the element 15 is materially less than the diameter of the pulley 14. The element 15 is arranged coaxially with the pulley 14.

The clutching mechanism includes the sleeve 7 which bodily revolves with the shaft 1. Secured to the flange 8 of the sleeve 7 and extending towards the pulley 14 is a pivot 29 for the pawl 30 of the clutching mechanism. The pawl 30 coacts with the element 15.

The sleeve 7 is formed with an integral lateral extension 31 which is integral with the rear face of the flange 8 and forms the latter with an enlarged part provided with an opening 32 for the passage of the pivot 29 for the pawl 30. The enlarged part of the flange 8, indicated at 33 has a threaded opening 34 disposed at right angles to the opening 32 and a set screw 35 is mounted in opening 34 for the purpose of fixedly securing pin 29 from movement with respect to sleeve 7. The pivot 29 at its outer end is provided with a head 36.

The pawl 30 is formed of an upper end portion 37, a lower end portion 38 and an intermediate portion 39. The latter is provided with an opening 40 for the passage of the shank 41 of the pivot 29. The portion 37 of the pawl 30 is formed with a forwardly directed nose 42 for engaging a ratchet 26 for the purpose of clutching the sleeve 7 with the pulley 14 whereby the shaft 1 and pulley 14 will revolve in unison. The rear lengthwise edge of the portion 38 of pawl 30 is provided with a semi-circular cut-out 43 forming a gullet for receiving a spring controlled stop plunger structure 44 to be hereinafter referred to. The pawl 30 normally tends to engage a ratchet 26, but such movement is arrested by the plunger structure 44 and this will be hereinafter more fully explained. The means which tends to normally force the pawl 30 to engage a ratchet 26 consists of a coiled spring surrounding shank 41 of pivot 29 and interposed between the head 36 of shank 41 and the forward face of pawl 30. One end of the spring 45 is anchored into the shank 41 as indicated at 46, and the other end of the spring 45 is anchored as at 47 to a headed pin or screw 48 secured in the portion 13 of the pawl 30. The tension of the spring 45 may be adjusted and for such purpose the shank 41, rearwardly of the enlargement 36 has a diametrically disposed opening 49 for the reception of a tool for rotating pivot 29 when screw 35 is shifted to release the latter. After the tension of the spring 45 has been adjusted, the shank 41 of pivot 29 is to be held stationary by the binding engagement therewith of the pin 35.

The clutching mechanism includes a stop 49ᵃ for arresting the movement of the portion 38 of the pawl 30 in a direction towards the element 15. The stop 49ᵃ is carried by the flange 8 of sleeve 7 and is formed with a flat facet 50 arranged in the path of the forward side edge of the said portion 38. The stop 49ᵃ is employed to arrest the upward movement of the portion 38 of the pawl 30 when the latter is shifted by the structure 44 to release pawl 30 from engagement with the element 15. The portion 38 of the pawl 30 depends beyond the edge of the flange 8 of sleeve 7.

The structure 44 is horizontally disposed and mounted in the socket 51 which may be provided by a socket forming element capable of being attached to the machine or it may be formed in a part of the body of the machine and is shown, by way of example as being formed in the body of the machine. That portion of the body of the machine which forms the socket 51 is provided with a lengthwise slot 52. The structure 44 includes a plunger element 53 having an inwardly opening socket 54 and between the base wall of the latter and the inner wall of socket 51 is positioned a coiled controlling spring 55 for the element 53. The latter at its outer end has a reduced head 56 of circular cross section and which is encompassed by bearing means 57. The element 53 has attached thereto a radially disposed abutment 58 of rod like form extended through the slot 52 and arranged in the path of the releasing structure 59 of the coupling mechanism. The structure 59 includes an upwardly inclined lever arm 60 which is pivotally connected at its lower end as at 61 to a support 62. The upper end of the arm 60 is rabbeted to form a shoulder 63 and a seat 64. Mounted on the support 62 is a bearing 66 through which extends a rock shaft 67. Spacing collars 68 are arranged on shaft 67 at each side of bearing 66. The shaft 67 is disposed at right angles with respect to the path of the plunger element 53 of the structure 44 and below the latter. The outer end of shaft 67 adjacent collar 68 has fixed thereto one end of a curved rock arm 69. The other end of the arm 69 has a threaded opening 70 in which is secured the threaded inner terminal portion of the shank 71 of a headed bolt 72. The head of the bolt is spaced from the arm 69 and extending between the head of bolt 72 and arm 69 is the seat 64 at the upper end of the lever 60. The seat 64 is mounted on the shank of the bolt 71. The inner end of the shaft 67 adjacent the other collar 68 has secured thereto the lower end of an upstanding shifting arm 73 having its upper end terminal reduced and its rear lengthwise edge formed with a groove 74 for receiving the abutment 58. The base of groove 74 permanently bears against the abutment 58 adjacent the upper end of the latter. The upper terminal portion of the arm 73 rides against that side of the part forming the socket 51 provided with a slot 52. Pivotally connected to the lever 60 at a point between its vertical median and its lower end, as at 75 is the upper end of a pull rod 76 operated by any suitable means, but preferably by a foot treadle not shown.

The normal position of the head 56 of the element 53 is within the gullet 43 and which maintains the pawl 30 in the position as shown in Figure 7. When lever 60 is operated by the pull rod 76 in a direction whereby the upper end of such lever will be lowered, the rock arm 69 is carried downwardly and which in turn will rock shaft 67 thereby moving the arm 73 in a rearward direction carrying the abutment 58 therewith whereby the head 56 of the plunger element 53 will be moved clear of the gullet 43 and clear of the portion 38 of the pawl 30, and the spring 45 will then act to move pawl 30 to engage the edge of element 15 and as element 15 is revolving with the pulley 14, the nose 42 will engage a ratchet 26 and provide for the clutching of sleeve 7 to the pulley 14 and the result will be the operation of the shaft 1 in unison with the pulley 14.

Immediately after the upper end of the lever 60 has been lowered, the pull rod 76 is released and the structure 44 will automatically assume the position shown in Figure 11 and as pawl 30 bodily moves with sleeve 7 the portion 38 of pawl 30 will have its rear edge contact with the plunger head 56 and pawl 30 will be moved clear of element 15 to the position shown in Figure 11. After pawl 30 has been shifted to the position shown in Figure 11, the spring 45 will shift the pawl 30 to the position shown in Figure 7, but the wall of the gullet 43 contacting with plunger head 56 will hold the member 30 in the position as illustrated by Figure 7. The stop 49ª locks the pawl 30 relative to the plunger 44 when the pawl is carried over too far due to momentum. The pawl then slips back and assumes the position shown in Figure 7, that is overlapping the plunger 44, and which is the inactive position of the clutch. This arrangement provides the non-repeat feature of the clutch, because the latter cannot pass with the stop 49ª unless the plunger 44 is withdrawn. When the small incline of the lower end portion 38 of the pawl 30 strikes against the plunger 44, the clutch is disengaged, the momentum carries pawl 30 over and when the highest point of such incline is reached it causes gullet 43 to drop over plunger 44, as shown in Figure 7. If the momentum carries pawl 30 further, the pawl will lock dead against stop 49ª, and then drift back into the position shown in Figure 7.

What I claim is:

1. In a clutching mechanism, a ratchet element adapted to be secured to and bodily carried with a revoluble driving element, a revoluble driven element arranged in juxtaposition to said ratchet element, a normally stationary headed pivot mounted in and extended from said driven element, releasable means for normally holding said pivot stationary, said pivot capable of being revolved when said means is released, a pawl loosely mounted intermediate its ends on said pivot, a controlling spring on said pivot having one end fixed to the pawl and its other end to the pivot, said pivot when revolved adjusting the tension of said spring, said spring permanently tending to have one terminal portion of the pawl engaging with the ratchet element for clutching the driven element with the driving element, the other end terminal portion of said pawl being extended from said pivot element, a retractible and automatically extendible plunger element for coaction with the said other end terminal portion to provide for releasably holding the pawl in a predetermined position of disengagement with respect to the ratchet element and for tripping the pawl to disengage it from the ratchet element, and means for retracting the plunger element for releasing the pawl whereby the latter will engage the ratchet element.

2. In a clutching mechanism, a ratchet element adapted to be secured to and bodily carried with a revoluble driving element, a revoluble driven element arranged in juxtaposition to said ratchet element, a normally stationary headed pivot mounted in and extended from said driven element, releasable means for normally holding said pivot stationary, said pivot capable of being revolved when said means is released, a pawl loosely mounted intermediate its ends on said pivot, a controlling spring on said pivot having one end fixed to the pawl and its other end to the pivot, said pivot when revolved adjusting the tension of said spring, said spring permanently tending to have one terminal portion of the pawl engaging with the ratchet element for clutching the driven element with the driving element, the other end terminal portion of said pawl being extended from said pivot element, a retractible and automatically extendible plunger element for coaction with the said other end terminal portion to provide for releasably holding the pawl in a predetermined position of disengagement with respect to the ratchet element and for tripping the pawl to disengage it from the ratchet element, and means for retracting the plunger element for releasing the pawl whereby the latter will engage the ratchet element, the said other end terminal portion of the pawl being provided with a gullet to receive the plunger element.

3. In a clutching mechanism, a ratchet element adapted to be secured to and bodily carried with a revoluble driving element, a revoluble driven element arranged in juxtaposition to said ratchet element, a normally stationary headed pivot mounted in and extended from said driven element, releasable means for normally holding said pivot stationary, said pivot capable of being revolved when said means is released, a pawl loosely mounted intermediate its ends on said pivot, a controlling spring on said pivot having one end fixed to the pawl and its other end to the pivot, said pivot when revolved adjusting the tension of said spring, said spring permanently tending to have one terminal portion of the pawl engaging with the ratchet element for clutching the driven element with the driving element, the other end terminal portion of said pawl being extended from said pivot element, a retractible and automatically extendible plunger element for coaction with the said other end terminal portion to provide for releasably holding the pawl in a predetermined position of disengagement with respect to the ratchet element and for tripping the pawl to disengage it from the ratchet element, means for retracting the plunger element for releasing the pawl whereby the latter will engage the ratchet element, and means on said driven element for limiting the extent of the movement of the pawl when tripped.

4. In a clutching mechanism, a ratchet element adapted to be secured to and bodily carried with a revoluble driving element, a revoluble driven element arranged in juxtaposition to said ratchet element, a normally stationary headed pivot mounted in and extended from said driven element, releasable means for normally holding said pivot stationary, said pivot capable of being revolved when said means is released, a pawl loosely mounted intermediate its ends on said pivot, a controlling spring on said pivot having one end fixed to the pawl and its other end to the pivot, said pivot when revolved adjusting the tension of said spring, said spring permanently tending to have one terminal portion of the pawl engaging with the ratchet element for clutching the driven element with the driving element, the other end terminal portion of said pawl being extended from said pivot element, a retractible and automatically extendible plunger element for coaction with the said other end terminal portion to provide for releasably holding the pawl in a predetermined position of disengagement with respect to the ratchet element and for tripping the pawl to disengage it from the ratchet element, and means for retracting the plunger element for releasing the pawl whereby the latter will engage the ratchet element, said pawl being disposed in an upstanding position and having its front edge formed with a nose to engage the ratchet element and its rear edge formed with a gullet to receive the plunger element.

5. In a clutching mechanism, a ratchet element adapted to be secured to and bodily carried with a revoluble driving element, a revoluble driven element arranged in juxtaposition to said ratchet element, a normally stationary headed pivot mounted in and extended from said driven element, releasable means for normally holding said pivot stationary, said pivot capable of being revolved when said means is released, a pawl loosely mounted intermediate its ends on said pivot, a controlling spring on said pivot having one end fixed to the pawl and its other end to the pivot, said pivot when revolved adjusting the tension of said spring, said spring permanently tending to have one terminal portion of the pawl engaging with the ratchet element for clutching the driven element with the driving element, the other end terminal portion of said pawl being extended from said pivot element, a retractible and automatically extendible plunger element for coaction with the said other end terminal portion to provide for releasably holding the pawl in a predetermined position of disengagement with respect to the ratchet element and for tripping the pawl to disengage it from the ratchet element, and means for retracting the plunger element for releasing the pawl whereby the latter will engage the ratchet element, the axis of said plunger element being disposed in a plane parallel to the plane of the axis of the driven element.

6. In a clutching mechanism, a ratchet element adapted to be secured to and bodily carried with a revoluble driving element, a revoluble driven element arranged in juxtaposition to said ratchet element, a normally stationary headed pivot mounted in and extended from said driven element, releasable means for normally holding said pivot stationary, said pivot capable of being revolved when said means is released, a pawl loosely mounted intermediate its ends on said pivot, a controlling spring on said pivot having one end fixed to the pawl and its other end to the pivot, said pivot when revolved adjusting the tension of said spring, said spring permanently tending to have one terminal portion of the pawl engaging with the ratchet element for clutching the driven element with the driving element, the other end terminal portion of said pawl being extended from said pivot element, a retractible and automatically extendible plunger element for coaction with the said other end terminal portion to provide for releasably holding the pawl in a predetermined position of disengagement with respect to the ratchet element and for tripping the pawl to disengage it from the ratchet element, and means for retracting the plunger element for releasing the pawl whereby the latter will engage the ratchet element, the axis of said plunger element being disposed in a plane parallel to the plane of the axis of said driven element.

ARNOLD FERDINAND FISCHER.